United States Patent
Domanski et al.

(10) Patent No.: US 9,384,417 B1
(45) Date of Patent: Jul. 5, 2016

(54) SYSTEM AND METHOD FOR OBJECT DIMENSION ESTIMATION

(71) Applicant: POLITECHNIKA POZNANSKA, Poznan (PL)

(72) Inventors: Marek Domanski, Poznan (PL);
Tomasz Grajek, Poznan (PL);
Krzysztof Klimaszewski, Murowana Goslina (PL); Maciej Kurc, Poznan (PL); Jakub Stankowski, Poznan (PL);
Robert Ratajczak, Lwowek (PL);
Krzysztof Wegner, Murowana Goslina (PL)

(73) Assignee: POLITECHNIKA POZNANSKA, Poznan (PL)

( * ) Notice: Subject to any disclaimer, the term of this patent is extended or adjusted under 35 U.S.C. 154(b) by 0 days.

(21) Appl. No.: 14/664,983

(22) Filed: Mar. 23, 2015

(30) Foreign Application Priority Data

Mar. 21, 2015 (PL) .......................................... 411656

(51) Int. Cl.
| | |
|---|---|
| *G06K 9/46* | (2006.01) |
| *G06K 9/52* | (2006.01) |
| *G06K 9/62* | (2006.01) |
| *G06K 9/00* | (2006.01) |

(52) U.S. Cl.
CPC .............. *G06K 9/52* (2013.01); *G06K 9/00771* (2013.01); *G06K 9/4661* (2013.01); *G06K 9/6201* (2013.01)

(58) Field of Classification Search
None
See application file for complete search history.

(56) References Cited

U.S. PATENT DOCUMENTS

| 8,224,037 | B2 * | 7/2012 | Liu | G06K 9/00288 382/100 |
| 8,675,953 | B1 * | 3/2014 | Elwell | G06T 7/0075 348/159 |

OTHER PUBLICATIONS

Ratajczak, R., Grajek, T., Wegner, K., Klimaszewski, K., Kurc, M., & Domanski, M. (Aug. 2013). Vehicle dimensions estimation scheme using AAM on stereoscopic video. In Advanced Video and Signal Based Surveillance (AVSS), 2013 10th IEEE International Conference on (pp. 478-482). IEEE.*

Groenwall, C. A., & Millnert, M. C. (Oct. 2001). Vehicle size and orientation estimation using geometric fitting. In Aerospace/Defense Sensing, Simulation, and Controls (pp. 412-423). International Society for Optics and Photonics.*

* cited by examiner

*Primary Examiner* — Sumati Lefkowitz
*Assistant Examiner* — David Perlman
(74) *Attorney, Agent, or Firm* — Mark M. Friedman

(57) ABSTRACT

A method for estimating a size of an object present on two images representing the same scene from different points of view, the method comprising: determining an AAM image model; matching the AAM image model to the images to find a set of parameters describing the shape of the model ($p_c$) and the appearance of the model ($\lambda_c$) for which minimal matching errors for both images occur; and estimating the size of the object based on the differences in locations of points of the AAM image model in the images. The image model is matched to both images mutually, i.e. by using information from both images.

3 Claims, 4 Drawing Sheets

SYSTEM AND METHOD FOR OBJECT DIMENSION ESTIMATION

TECHNICAL FIELD

The present disclosure relates to a system and method for object dimension estimation. In particular, the disclosure relates to a road traffic surveillance system for estimation of dimensions of vehicles.

BACKGROUND

Computer vision is a field that includes methods for acquiring, processing, analyzing, and understanding images and, in general, high-dimensional data from the real world in order to produce numerical or symbolic information, e.g., in the forms of decisions. One of objectives of computer vision is to duplicate the abilities of human vision by electronically perceiving and understanding an image. This can be seen as disentangling of symbolic information from image data using models constructed with the aid of geometry, physics, statistics, and machine learning theory. Computer vision has also been described as the venture of automating and integrating a wide range of processes and representations for vision perception.

Sub-domains of computer vision include scene reconstruction, event detection, video tracking, object recognition, machine learning, indexing, motion estimation, and image restoration.

Computer vision can be employed in road traffic surveillance, for example to estimate dimensions of vehicles, e.g. to allow automatic collection of fees, to identify oversize vehicles that exceed allowable dimensions defined by law or to identify vehicles that cannot enter some areas such as tunnels, passes under bridges etc.

A U.S. Pat. No. 8,675,953 discloses an electronic device that determines a geometric scale of an object using two or more images of the object. During operation, the electronic device calculates the size of the object along a direction using multiple images of the object that were taken from different perspectives (such as different locations and/or orientations in an environment) along with associated imaging-device characteristics. For example, the size of the object may be calculated using the images, the associated focal lengths of a digital camera that acquired the images, and the law of cosines. Using the scale of the object, an image of the object may be appropriately scaled so that it can be combined with another image.

A publication "Vehicle Size and Orientation Estimation Using Geometric Fitting" (Christina Carlsson, Department of Electrical Engineering, Linköpings universitet, Linköping, Sweden (ISBN 91-7219-790-0)) discloses a vehicle size and orientation estimation process based on scanning laser radar data.

Active Appearance Model (AAM) is a technique which exploits deformable model matching into an object's image. Originally it was developed for face detection but it has been proved that the technique is useful for various kinds of objects. The AAM consists of two parts: shape and appearance (texture). The shape is defined by a set of points which are grouped into multiple closed polygons, while the appearance (texture) consists of all pixels that lie inside the defined shape polygons.

A publication "Vehicle Dimensions Estimation Scheme Using AAM on Stereoscopic Video" (R. Ratajczak et al, 10th IEEE International Conference on Advanced Video and Signal-Based Surveillance, AVSS 2013, Workshop on Vehicle Retrieval in Surveillance (VRS) 2013, Kraków, Poland, 27-30 Aug. 2013, pp. 4321-4325) presents a method for object dimension estimation, based on active appearance model (AAM) and using stereoscopic video analysis. The method includes a search for the same vehicle in both images of a stereo pair independently, using a view-independent AAM. It is assumed that after AAM search step, particular points of the fitted models indicate 2D locations of the same 3D point in both images, which allows to simply calculate disparities between those corresponding model points fitted in both images.

The known methods that allow to determine the metric dimensions of objects require use of cameras calibrated to allow precise dimension measurement or laser scanners. For example, an image registered by two cameras aligned in parallel at a distance of 2 m from each other and observing an object distanced by 1 m having a size of 1 m will be the same as an image registered by two cameras aligned in parallel at a distance of 20 m from each other and observing an object distanced by 10 m having a size of 10 m. This is a problem of a scale of the camera system.

It would be advantageous to present a cost efficient and resource efficient system for object dimension estimation.

SUMMARY

There is disclosed a method for estimating a size of an object present on two images representing the same scene from different points of view, the method comprising: determining an AAM image model and matching the AAM image model to the images to find a set of parameters describing the shape of the model ($p_c$) and the appearance of the model ($\lambda_c$) for which minimal matching errors for both images occur by calculating the matching error for the first image as a sum of two summands:

a first summand, related to the first image, calculated as a sum of squares of the difference between the appearance of the AAM image model for the first image at the pixel (x) and the intensity of the input first image ($I_L$) at the pixel determined by the affine warp function ($W_{S_{L_0}}(x,p_L)$), which warps the actual shape for the first image described by parameters ($p_L$) onto the mean shape ($S_{L_0}$) of the first image;

a second summand, related to both images, calculated as a sum of squares of the difference between the appearance of the AAM image model for the first image at the pixel (x) and the intensity of the input second image ($I_R$) at the pixel determined by the modified affine warp ($\widetilde{W}_{S_{L_0}}(x,p_R)$), which warps the actual shape for the second image described by ($p_R$) parameters onto the mean shape ($S_{L_0}$) of the first image;

and calculating the matching error for the second image as a sum of two summands:

a third summand, related to the second image, calculated as a sum of squares of the difference between the appearance of the AAM image model for the second image at the pixel (x) and the intensity of the input second image ($I_R$) at the pixel determined by the affine warp function ($W_{S_{R_0}}(x,p_R)$), which warps the actual shape for the second image described by parameters ($p_R$) onto the mean shape ($S_{R_0}$) of the second image;

a fourth summand, related to both images (left and right), calculated as a sum of squares of the difference between the appearance of the AAM image model for the second image at the pixel (x) and the intensity of the input first image ($I_L$) at the pixel determined by the modified affine warp ($\widetilde{W}_{S_{R_0}}(x,p_L)$), which warps the actual shape for the first image described by ($p_L$) parameters onto the mean shape ($S_{R_0}$) of the second image.

The method further comprises estimating the size of the object based on the differences in locations of points of the AAM image model in the images.

There is also disclosed a computing device program product for estimating a size of an object present on two images representing the same scene from different points of view, the computing device program product comprising a non-transitory computer readable medium. First first programmatic instructions are for determining an AAM image model. Second programmatic instructions are for matching the AAM image model to the images to find a set of parameters describing the shape of the model ($p_c$) and the appearance of the model ($\lambda_c$) for which minimal matching errors for both images occur by calculating the matching error for the first image as a sum of two summands:

a first summand, related to the first image, calculated as a sum of squares of the difference between the appearance of the AAM image model for the first image at the pixel (x) and the intensity of the input first image ($I_L$) at the pixel determined by the affine warp function ($W_{S_{L_0}}(x,p_L)$), which warps the actual shape for the first image described by parameters ($p_L$) onto the mean shape ($S_{L_0}$) of the first image;

a second summand, related to both images, calculated as a sum of squares of the difference between the appearance of the AAM image model for the first image at the pixel (x) and the intensity of the input second image ($I_R$) at the pixel determined by the modified affine warp ($\widetilde{W}_{S_{L_0}}(x,p_R)$), which warps the actual shape for the second image described by ($p_R$) parameters onto the mean shape ($S_{L_0}$) of the first image;

and calculating the matching error for the second image as a sum of two summands:

a third summand, related to the second image, calculated as a sum of squares of the difference between the appearance of the AAM image model for the second image at the pixel (x) and the intensity of the input second image ($I_R$) at the pixel determined by the affine warp function ($W_{S_{R_0}}(x,p_R)$), which warps the actual shape for the second image described by parameters ($p_R$) onto the mean shape ($S_{R_0}$) of the second image;

a fourth summand, related to both images (left and right), calculated as a sum of squares of the difference between the appearance of the AAM image model for the second image at the pixel (x) and the intensity of the input first image ($I_L$) at the pixel determined by the modified affine warp ($\widetilde{W}_{S_{R_0}}(x,p_L)$), which warps the actual shape for the first image described by ($p_L$) parameters onto the mean shape ($S_{R_0}$) of the second image;

Third programmatic instructions are for estimating the size of the object based on the differences in locations of points of the AAM image model in the images.

There is further disclosed a system for estimating a size of an object present on two images representing the same scene from different points of view, the system comprising: an AAM generator for determining an AAM image model; and a model matching module for matching the AAM image model to the images to find a set of parameters describing the shape of the model ($p_c$) and the appearance of the model ($\lambda_c$) for which minimal matching errors for both images occur by calculating the matching error for the first image as a sum of two summands:

a first summand, related to the first image, calculated as a sum of squares of the difference between the appearance of the AAM image model for the first image at the pixel (x) and the intensity of the input first image ($I_L$) at the pixel determined by the affine warp function ($W_{S_{L_0}}(x,p_L)$), which warps the actual shape for the first image described by parameters ($p_L$) onto the mean shape ($S_{L_0}$) of the first image;

a second summand, related to both images, calculated as a sum of squares of the difference between the appearance of the AAM image model for the first image at the pixel (x) and the intensity of the input second image ($I_R$) at the pixel determined by the modified affine warp ($\widetilde{W}_{S_{L_0}}(x,p_R)$), which warps the actual shape for the second image described by ($p_R$) parameters onto the mean shape ($S_{L_0}$) of the first image;

and calculating the matching error for the second image as a sum of two summands:

a third summand, related to the second image, calculated as a sum of squares of the difference between the appearance of the AAM image model for the second image at the pixel (x) and the intensity of the input second image ($I_R$) at the pixel determined by the affine warp function ($W_{S_{R_0}}(x,p_R)$), which warps the actual shape for the second image described by parameters ($p_R$) onto the mean shape ($S_{R_0}$) of the second image;

a fourth summand, related to both images (left and right), calculated as a sum of squares of the difference between the appearance of the AAM image model for the second image at the pixel (x) and the intensity of the input first image ($I_L$) at the pixel determined by the modified affine warp ($\widetilde{W}_{S_{R_0}}(x,p_L)$), which warps the actual shape for the first image described by ($p_L$) parameters onto the mean shape ($S_{R_0}$) of the second image;

A dimensions estimator is further comprised in the system for estimating the size of the object based on the differences in locations of points of the AAM image model in the images.

BRIEF DESCRIPTION OF FIGURES

The presented method and system will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system.

For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

DESCRIPTION OF EMBODIMENTS

Figure 1:
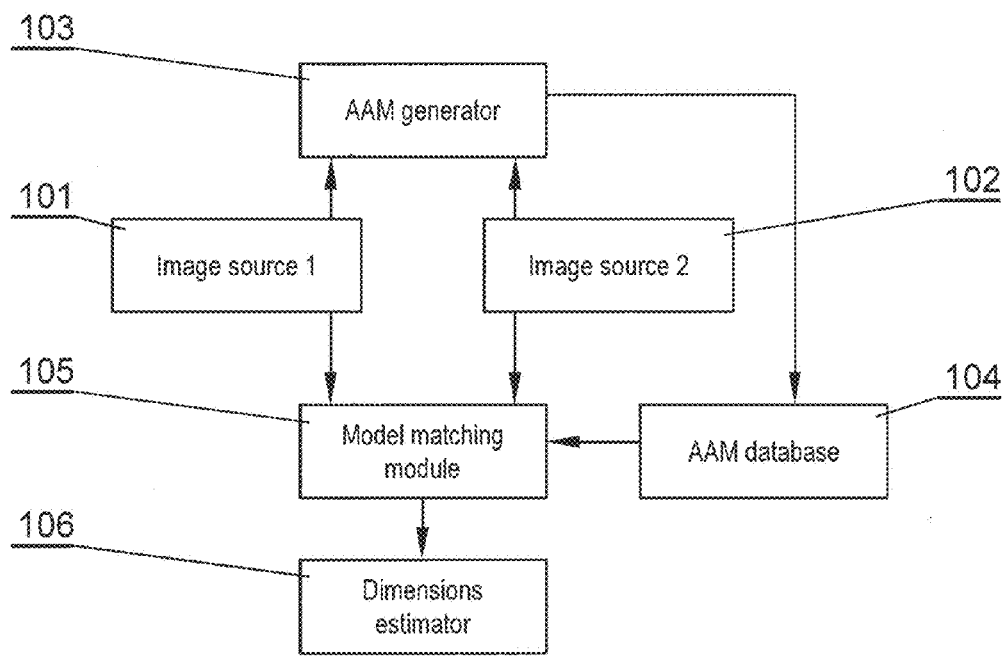
FIG. 1 presents a diagram of the system.
Figures 2A, 2B, 2C, 2D:
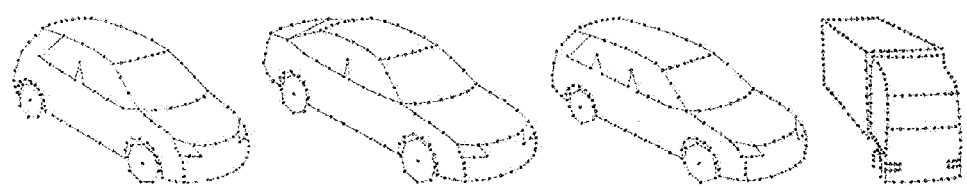
FIGS. 2A-2D present AAMs for different types of vehicles.

FIG. 1 presents a diagram of the system. The system comprises two image sources 101, 102, e.g. two cameras of a stereoscopic surveillance system. The images from sources 101, 102 can be used to generate an AAM database in an AAM generator 103 to be stored in AAM database 104, comprising shapes of typical objects for which dimensions are to be estimated. For example, the AAM database 104 may comprise AAMs for different types of vehicles, such as a hatchback, a sedan, a wagon, a truck, as presented in FIGS. 2A-2D. The AAMs are input, together with the images from sources 101, 102 to an image-model matching module 105. After the model is matched with the image, the dimensions of the object can be estimated in a dimensions estimator 106.

The presented embodiment relates to estimation of the size of vehicles, but the presented method and system can be used for estimation of size of other objects as well, such as human shape, packages in a sorting departments, products on a production lines etc.

Figure 3:
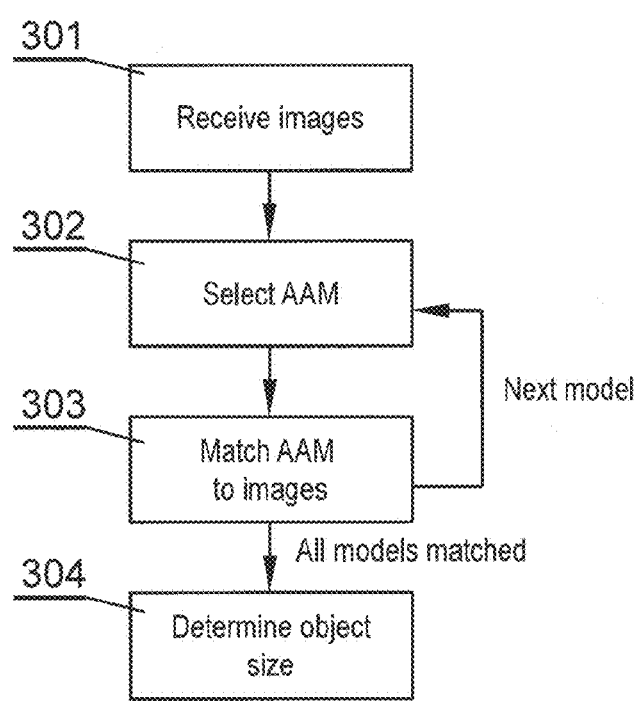
FIG. 3 presents a diagram of the general method for dimension estimation.
Figure 4:
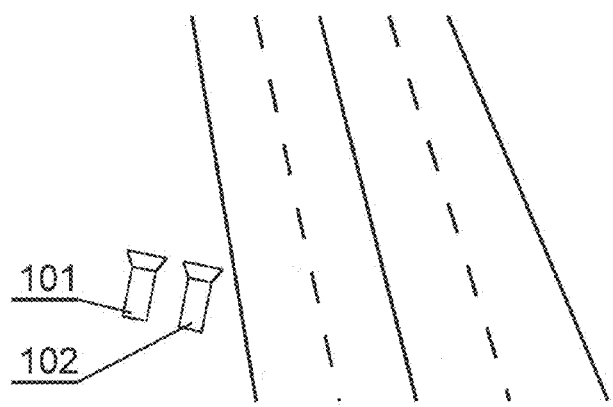
FIG. 4 presents an example of a setup of image acquisition system.
Figure 5A:
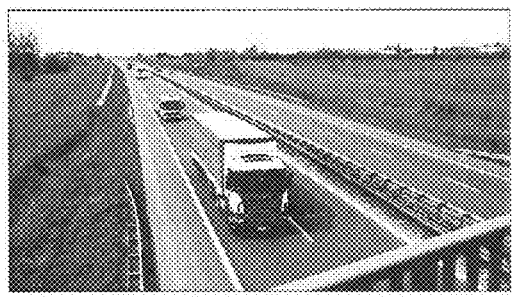
FIGS. 5A-5B present images of a left and a right camera.
Figure 5B:
Figure 6A:
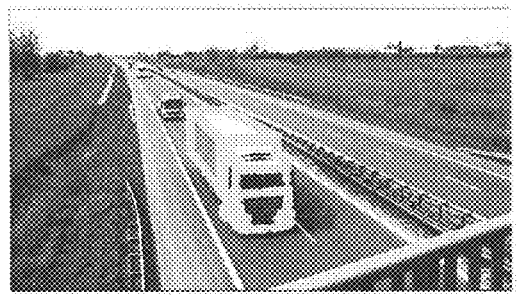
FIGS. 6A-6B present images of a left and a right camera with AAMs matched.
Figure 6B:
Figure 7:
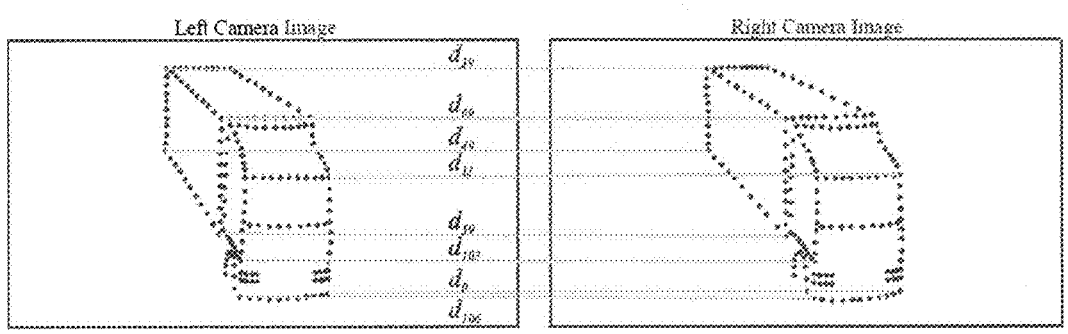
FIG. 7 presents disparities in locations of the same point $d_i$ of the model in both acquired images.

FIG. 3 presents a diagram of the general method for dimension estimation, which generally corresponds to the method described in the article "Vehicle Dimensions Estimation Scheme Using AAM on Stereoscopic Video" as mentioned in the background section. First, at least two images representing a scene are obtained in step 301. The following example will be related to a pair of stereoscopic images obtained e.g. from two cameras located alongside of a road in a setup as shown in FIG. 4, wherein the images may have a content as shown in FIGS. 5A, 5B showing images of the left and right camera. However, the described method may be also performed on a set of images comprising more than two images, e.g. three, four or more images showing the same scene from multiple points of view with arbitrary camera arrangement, in order to e.g. improve accuracy. In step 302, an AAM model is selected from the AAM database 104 and matched to the images in step 303 by the image-model matching module 105. The procedure of selection and matching of steps 302-303 is performed for all models in the AAM database or for pre-selected models, until the best fit is found. As a result, the model is matched to the images as shown in FIGS. 6A-6B. After the model is fitted to both images, in step 304 the size of the object can be determined, by the dimensions estimator module 106, based on the differences in locations of the same point of the model in both acquired images, for example by disparity $d_i$ estimation from stereo pair (as shown schematically in FIG. 7, wherein $d_i$ is the disparity between the position of point i on both images, or any other method known in the prior art.

The image-model matching module estimates the matching error as follows. In the prior art method as described in publication "Vehicle Dimensions Estimation Scheme Using AAM on Stereoscopic Video" described in the introductory section, the same AAM model was independently matched to both images. In the new method presented herein, the image model is matched to both images mutually, i.e. by using information from both images.

In general, a 2D shape s of a 2D Active Appearance Model is defined as the coordinates of the n vertices:

$$s=(u_1, v_1, u_2, v_2, \ldots, u_n, v_n)^T$$

and can be expressed as a mean shape $s_0$ plus a linear combination of m shape vectors $s_i$:

$$s = s_0 + \sum_{i=1}^{m} p_i s_i$$

where the coefficients $p_i$ are the shape parameters.

The appearance A(x) can be expressed as a mean appearance $A_0(x)$ plus a linear combination of l appearance images $A_i(x)$:

$$A(x) = A_0(x) + \sum_{i=1}^{l} \lambda_i A_i(x)$$

The goal of matching the model with an image is to find such a set of shape and appearance (texture) parameters which would minimize the error between the model texture (appearance) and the underlying image.

In case the model is to be matched to the images independently, as in the prior art methods, the following equations describe the energy of the matching error for the left image ($E_L$) and the right image ($E_R$):

$$E_L = \sum_x \left[A_{L_0}(x) + \lambda_L A_L^T(x) - I_L(W_{S_{L_0}}(x, p_L))\right]^2$$

$$E_R = \sum_x \left[A_{R_0}(x) + \lambda_R A_R^T(x) - I_R(W_{S_{R_0}}(x, p_R))\right]^2$$

In the new method presented herein, the above equations describing the energy of the matching error for the left image ($E_L$) and the right image ($E_R$) are supplemented by additional terms, which are related to the matching of second image to the first image:

$$E_L = \sum_x \left[A_{L_0}(x) + \lambda_L A_L^T(x) - I_L(W_{S_{L_0}}(x, p_L))\right]^2 +$$
$$\sum_x \left[A_{L_0}(x) + \lambda_L A_L^T(x) - I_R(\tilde{W}_{S_{L_0}}(x, p_R))\right]^2$$

-continued
$$E_R = \sum_x \left[A_{R_0}(x) + \lambda_R A_R^T(x) - I_R(W_{S_{R_0}}(x, p_R))\right]^2 +$$
$$\sum_x \left[A_{R_0}(x) + \lambda_R A_R^T(x) - I_L(\tilde{W}_{S_{R_0}}(x, p_L))\right]^2$$

wherein:
x—is the 2D point index
$p_c$—are the parameters describing the shape of the model, wherein c describes the image source (e.g. left (L) or right (R) camera)
A—is the vector describing the appearance of the model
$A_0$—is the mean appearance of the model
$\lambda_c$—are the parameters which describe the object appearance, wherein c describes the image source (e.g. left (L) or right (R) camera)
$I_{L,R}(v)$—is the intensity of the 2D image in the v pixel in the left and right image respectively
$W_{S_{L_0,R_0}}(x,p_{L,R})$—is an affine warp function, wherein x describes 2D point index
$\tilde{W}_{S_{L_0,R_0}}(x,p_{L,R})$—is a modified affine warp function
$E_{L,R}$—is the energy of the matching error of the model in the left and right image respectively Therefore, the matching error for the first image (in the present example: the left image ($E_L$)) according to the proposed new method is calculated as a sum of two summands:
  the first summand, related to a first image (the left image), calculated as a sum of squares of the difference between the appearance of the AAM image model for the first image at the pixel x and the intensity of the input first image $I_L$ at the pixel determined by the affine warp function $W_{S_{L_0}}(x,p_L)$, which warps the actual shape for the first image described by parameters $p_L$ onto the mean shape $S_{L_0}$ of the first image,
  the second summand, related to both images (left and right), calculated as a sum of squares of the difference between the appearance of the AAM image model for the first image at the pixel x and the intensity of the input second image $I_R$ at the pixel determined by the modified affine warp $\tilde{W}_{S_{L_0}}(x,p_R)$, which warps the actual shape for the second image described by $p_R$ parameters onto the mean shape $S_{L_0}$ of the first image.
Similarly, the matching error for the second image (in that case, the right image) is calculated:
  a third summand, related to the second image (the right image), calculated as a sum of squares of the difference between the appearance of the AAM image model for the second image at the pixel x and the intensity of the input second image $I_R$ at the pixel determined by the affine warp function $W_{S_{R_0}}(x,p_R)$, which warps the actual shape for the second image described by parameters $p_R$ onto the mean shape $S_{R_0}$ of the second image,
  a fourth summand, related to both images (left and right), calculated as a sum of squares of the difference between the appearance of the AAM image model for the second image at the pixel x and the intensity of the input first image $I_L$ at the pixel determined by the modified affine warp $\tilde{W}_{S_{R_0}}(x,p_L)$, which warps the actual shape for the first image described by $p_L$ parameters onto the mean shape $S_{R_0}$ of the second image.

The matching error is calculated for various parameters describing the shape of the model ($p_c$) and the appearance of the model ($\lambda_c$) until the minimal matching errors for both images are found, e.g. by using a known gradient method.

It will be evident for a skilled person how to modify the method described above to analyze pictures acquired with use of other registration devices arrangement, for example top/bottom arranged devices.

The invention improves on image processing in stereoscopic systems, by allowing estimating a size of an object present on two images representing the same scene from different points of view. Therefore, the invention provides a useful, concrete and tangible result.

Advantages obtained by application of the present invention include more accurate estimation of object dimensions. An implementation in a particular machine has been disclosed in the foregoing specification. Thus the machine or transformation test is fulfilled and that the idea is not abstract.

It can be easily recognized, by one skilled in the art, that the aforementioned method for estimating a size of an object may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

What is claimed is:
1. A method for estimating a size of an object present on two images representing the same scene from different points of view, the method comprising:
  determining an AAM image model;
  matching the AAM image model to the images to find a set of parameters describing the shape of the model ($p_c$) and the appearance of the model ($\lambda_c$) for which minimal matching errors for both images occur by:
    calculating the matching error for the first image as a sum of two summands:
  a first summand, related to the first image, calculated as a sum of squares of the difference between the appearance of the AAM image model for the first image at the pixel (x) and the intensity of the input first image ($I_L$) at the pixel determined by the affine warp function ($W_{S_{L_0}}(x,p_L)$), which warps the actual shape for the first image described by parameters ($p_L$) onto the mean shape ($S_{L_0}$) of the first image;
  a second summand, related to both images, calculated as a sum of squares of the difference between the appearance of the AAM image model for the first image at the pixel (x) and the intensity of the input second image ($I_R$) at the pixel determined by the modified affine warp ($\tilde{W}_{S_{L_0}}(x,p_R)$), which warps the actual shape for the second image described by ($p_R$) parameters onto the mean shape ($S_{L_0}$) of the first image;

calculating the matching error for the second image as a sum of two summands:

a third summand, related to the second image, calculated as a sum of squares of the difference between the appearance of the AAM image model for the second image at the pixel (x) and the intensity of the input second image ($I_R$) at the pixel determined by the affine warp function ($W_{S_{R_0}}(x,p_R)$), which warps the actual shape for the second image described by parameters ($p_R$) onto the mean shape ($S_{R_0}$) of the second image;

a fourth summand, related to both images (left and right), calculated as a sum of squares of the difference between the appearance of the AAM image model for the second image at the pixel (x) and the intensity of the input first image ($I_L$) at the pixel determined by the modified affine warp ($\tilde{W}_{S_{R_0}}(x,p_L)$), which warps the actual shape for the first image described by ($p_L$) parameters onto the mean shape ($S_{R_0}$) of the second image;

and estimating the size of the object based on the differences in locations of points of the AAM image model in the images.

2. A computing device program product for estimating a size of an object present on two images representing the same scene from different points of view, the computing device program product comprising:

a non-transitory computer readable medium;

first programmatic instructions for determining an AAM image model;

second programmatic instructions for matching the AAM image model to the images to find a set of parameters describing the shape of the model ($p_c$) and the appearance of the model ($\lambda_c$) for which minimal matching errors for both images occur by:

calculating the matching error for the first image as a sum of two summands:

a first summand, related to the first image, calculated as a sum of squares of the difference between the appearance of the AAM image model for the first image at the pixel (x) and the intensity of the input first image ($I_L$) at the pixel determined by the affine warp function ($W_{S_{L_0}}(x,p_L)$), which warps the actual shape for the first image described by parameters ($p_L$) onto the mean shape ($S_{L_0}$) of the first image;

a second summand, related to both images, calculated as a sum of squares of the difference between the appearance of the AAM image model for the first image at the pixel (x) and the intensity of the input second image ($I_R$) at the pixel determined by the modified affine warp ($\tilde{W}_{S_{L_0}}(x,p_R)$), which warps the actual shape for the second image described by ($p_R$) parameters onto the mean shape ($S_{L_0}$) of the first image;

calculating the matching error for the second image as a sum of two summands:

a third summand, related to the second image, calculated as a sum of squares of the difference between the appearance of the AAM image model for the second image at the pixel (x) and the intensity of the input second image ($I_R$) at the pixel determined by the affine warp function ($W_{S_{R_0}}(x,p_R)$), which warps the actual shape for the second image described by parameters ($p_R$) onto the mean shape ($S_{R_0}$) of the second image;

a fourth summand, related to both images (left and right), calculated as a sum of squares of the difference between the appearance of the AAM image model for the second image at the pixel (x) and the intensity of the input first image ($I_L$) at the pixel determined by the modified affine warp ($\tilde{W}_{S_{R_0}}(x,p_L)$), which warps the actual shape for the first image described by ($p_L$) parameters onto the mean shape ($S_{R_0}$) of the second image;

third programmatic instructions for estimating the size of the object based on the differences in locations of points of the AAM image model in the images.

3. A system for estimating a size of an object present on two images representing the same scene from different points of view, the system comprising:

an AAM generator for determining an AAM image model;

a model matching module for matching the AAM image model to the images to find a set of parameters describing the shape of the model ($p_c$) and the appearance of the model ($\lambda_c$) for which minimal matching errors for both images occur by:

calculating the matching error for the first image as a sum of two summands:

a first summand, related to the first image, calculated as a sum of squares of the difference between the appearance of the AAM image model for the first image at the pixel (x) and the intensity of the input first image ($I_L$) at the pixel determined by the affine warp function ($W_{S_{L_0}}(x,p_L)$), which warps the actual shape for the first image described by parameters ($p_L$) onto the mean shape ($S_{L_0}$) of the first image;

a second summand, related to both images, calculated as a sum of squares of the difference between the appearance of the AAM image model for the first image at the pixel (x) and the intensity of the input second image ($I_R$) at the pixel determined by the modified affine warp ($\tilde{W}_{S_{L_0}}(x,p_R)$), which warps the actual shape for the second image described by ($p_R$) parameters onto the mean shape ($S_{L_0}$) of the first image;

calculating the matching error for the second image as a sum of two summands:

a third summand, related to the second image, calculated as a sum of squares of the difference between the appearance of the AAM image model for the second image at the pixel (x) and the intensity of the input second image ($I_R$) at the pixel determined by the affine warp function ($W_{S_{R_0}}(x,p_R)$), which warps the actual shape for the second image described by parameters ($p_R$) onto the mean shape ($S_{R_0}$) of the second image;

a fourth summand, related to both images (left and right), calculated as a sum of squares of the difference between the appearance of the AAM image model for the second image at the pixel (x) and the intensity of the input first image ($I_L$) at the pixel determined by the modified affine warp ($\tilde{W}_{S_{R_0}}(x,p_L)$), which warps the actual shape for the first image described by ($p_L$) parameters onto the mean shape ($S_{R_0}$) of the second image;

and a dimensions estimator for estimating the size of the object based on the differences in locations of points of the AAM image model in the images.

* * * * *